(12) United States Patent
Law

(10) Patent No.: US 6,261,682 B1
(45) Date of Patent: *Jul. 17, 2001

(54) ABRASIVE ARTICLES INCLUDING AN ANTILOADING COMPOSITION

(75) Inventor: Kam W. Law, Woodbury, MN (US)

(73) Assignee: 3M Innovative Properties, St. Paul, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/107,818

(22) Filed: Jun. 30, 1998

(51) Int. Cl.$^7$ ............ B32B 15/04; B32B 27/38; B32B 27/40; B32B 23/08; C09K 3/14

(52) U.S. Cl. ............ 428/343; 428/411.1; 428/413; 428/422.8; 428/423.1; 428/425.1; 428/480; 428/481; 428/500; 428/511; 428/524; 428/530; 51/298; 51/304

(58) Field of Search ............ 428/413, 423.1, 428/480, 500, 323, 402, 473.5, 425.1, 422.8, 481, 511, 524, 530, 343, 411.1; 51/298, 304

(56) References Cited

U.S. PATENT DOCUMENTS

| | | | |
|---|---|---|---|
| 2,768,886 | 10/1956 | Twombly | 51/295 |
| 2,893,854 | 7/1959 | Rinker et al. | 51/298 |
| 2,958,593 | 11/1960 | Hoover et al. | 51/295 |
| 3,619,150 | 11/1971 | Rinker et al. | 51/295 |
| 3,781,172 | 12/1973 | Pett et al. | 51/309 |
| 3,849,949 | 11/1974 | Steinhauser et al. | 51/406 |
| 3,891,408 | 6/1975 | Rowse et al. | 51/295 |
| 3,893,826 | 7/1975 | Quinan et al. | 51/295 |
| 4,396,403 | 8/1983 | Ibrahim | 51/295 |
| 4,505,720 | 3/1985 | Gabor et al. | 51/295 |
| 4,518,397 | 5/1985 | Leitheiser et al. | 51/293 |
| 4,574,003 | 3/1986 | Gerk | 51/309 |
| 4,609,581 | 9/1986 | Ott | 428/100 |
| 4,652,274 | 3/1987 | Boettcher et al. | 51/298 |
| 4,744,802 | 5/1988 | Schwabel | 51/309 |
| 4,751,138 | 6/1988 | Tumey et al. | 428/323 |
| 4,770,671 | 9/1988 | Monroe et al. | 51/293 |
| 4,784,671 | 11/1988 | Elbel | 51/293 |
| 4,800,685 | 1/1989 | Haynes, Jr. | 51/281 R |
| 4,881,951 | 11/1989 | Wood et al. | 51/309 |
| 4,903,440 | 2/1990 | Larson et al. | 51/298 |
| 4,973,338 | 11/1990 | Gaeta et al. | 51/295 |
| 4,988,554 | 1/1991 | Peterson et al. | 428/142 |
| 4,991,362 | 2/1991 | Heyer et al. | 51/400 |
| 5,011,508 | 4/1991 | Wald et al. | 51/293 |
| 5,055,113 | 10/1991 | Larson et al. | 51/298 |
| 5,108,463 | 4/1992 | Buchanan | 51/295 |
| 5,137,542 | 8/1992 | Buchanan et al. | 51/295 |
| 5,236,472 | 8/1993 | Kirk et al. | 51/298 |
| 5,254,194 | 10/1993 | Ott et al. | 156/176 |
| 5,314,513 | 5/1994 | Miller et al. | 51/295 |
| 5,328,716 | 7/1994 | Buchanan | 427/121 |
| 5,417,726 | 5/1995 | Stout et al. | 51/293 |
| 5,436,063 | 7/1995 | Follett et al. | 428/224 |
| 5,486,219 | 1/1996 | Ford et al. | 51/298 |
| 5,500,302 | 3/1996 | Phillips et al. | 428/474.4 |
| 5,505,747 | 4/1996 | Chesley et al. | 51/297 |
| 5,551,962 | 9/1996 | Ho | 51/306 |
| 5,552,225 | 9/1996 | Ho | 428/403 |
| 5,560,753 | 10/1996 | Schnabel et al. | 51/295 |
| 5,565,011 | 10/1996 | Follett et al. | 51/297 |
| 5,573,619 | 11/1996 | Benedict et al. | 156/137 |
| 5,667,542 | 9/1997 | Law et al. | 51/308 |
| 5,672,185 | 9/1997 | Ryoke | 51/295 |
| 5,704,952 | 1/1998 | Law et al. | 51/306 |

FOREIGN PATENT DOCUMENTS

| | | |
|---|---|---|
| 0 414 346 | 2/1991 | (EP). |
| 0 433 031 | 6/1991 | (EP). |
| 0 552 698 | 7/1993 | (EP). |
| 712718 | 7/1954 | (GB). |
| WO 97/42007 | 11/1997 | (WO). |

*Primary Examiner*—Paul Thibodeau
*Assistant Examiner*—Holly C. Rickman
(74) *Attorney, Agent, or Firm*—Gregory D. Allen

(57) ABSTRACT

An abrasive article comprising a backing, a plurality of abrasive particles, a binder which adheres the abrasive particles to the backing, and a peripheral coat including an antiloading component is provided. The antiloading component is of the formula $(C_nH_{2n+1})$—COO—M, wherein n is greater than 17 and M is selected from Group 1 of the Periodic Table, with the proviso that when M is lithium, n is greater than 21. The antiloading component can be included in a coated abrasive article, such as a lapping or structured abrasive article, and a nonwoven abrasive article.

15 Claims, No Drawings

ABRASIVE ARTICLES INCLUDING AN ANTILOADING COMPOSITION

FIELD OF THE INVENTION

The invention relates to abrasive articles including an antiloading composition. In particular, abrasive articles in accordance with the invention are useful in abrading the surface of metal, metal alloys, glass, wood, paint, plastics, body filler, primer, etc. Also included are methods for making and methods of using abrasive articles.

BACKGROUND OF THE INVENTION

In general, coated abrasive products are known to have abrasive particles adherently bonded to a flexible backing. It is generally known to stratify the abrasive particles and binders, such as in coated abrasive articles, in such a way as to basically segregate the abrasive particles between an underlying binder and an overlaying binder.

More typically, abrasive products have a backing, abrasive particles, and a binder which operates to bond or hold the abrasive particles to the backing. For example, a typical coated abrasive product has a backing that is first coated with a binder, commonly referred to as a "make coat", and then the abrasive particles are applied to the make coat. The application of the abrasive particles to the make coat typically involves electrostatic deposition or a mechanical process which maximizes the probability that the individual abrasive particles are positioned with their major axis oriented perpendicular to the backing surface. As so applied, the abrasive particles optimally are at least partially embedded in the make coat that is then generally solidified or set (such as by a series of drying or curing ovens) to a state sufficient to retain the adhesion of abrasive particles to the backing.

Optionally, after precuring or setting the make coat, a second binder, commonly referred to as a "size coat", can be applied over the surface of the make coat and abrasive particles, and, upon setting, it further supports the particles and enhances the anchorage of the particles to the backing. Further, a "supersize" coat, which may contain grinding aids, anti-loading materials or other additives can be applied over the cured size coat. In any event, once the size coat and supersize coat, if used, has been cured, the resulting coated abrasive product can be converted into a variety of convenient forms such as sheets, rolls, belts, and discs.

Coated abrasives are used to abrade a variety of workpieces including metal, metal alloys, glass, wood, paint, plastics, body filler, primer, etc. In abrading certain workpieces, for example, wood, paint, body filler, primer, and plastics, the coated abrasive has a tendency to "load." "Load" or "loading" are terms used in the industry to describe the debris, or swarf, that is abraded away from the workpiece surface that subsequently becomes lodged between the abrasive particles of the abrasive article. Loading is generally undesirable because the debris lodged between abrasive particles inhibits the cutting ability of the abrasive article.

One solution to the loading problem is to apply a coating to an abrasive article so that it is available at the interface between the abrasive article and the workpiece surface to inhibit loading. For example, U.S. Pat. No. 2,768,886 (Twombly et al.) and U.K. Patent No. 712,718 each describe a metal stearate or palmitate applied to the surface of an abrasive article. U.S. Pat. Nos. 2,893,854 and 3,619,150 (both to Rinker et al.) each describe a metallic water-insoluble soap of a saturated fatty acid having from 16 to 18 carbon atoms that is applied to an abrasive article. U.S. Pat. No. 4,396,403 (Ibrahim) describes an abrasive article including a coating containing a material selected from the group consisting of phosphoric and condensed phosphoric acids and partial esters, including amine salts thereof, tetraorganyl ammonium salts having at least one long organyl group containing at least eight carbon atoms, and mixtures thereof. Other materials that have been applied to an abrasive article include, for example, a quaternary ammonium salt having from about 15 to about 35 carbon atoms (U.S. Pat. No. 4,973,338 to Gaeta et al.) and a lithium salt of a saturated fatty acid having 4 to 22 carbon atoms (U.S. Pat. No. 4,988,554 to Peterson et al.). Other antiloading components are also described by Law et al. in U.S. Pat. Nos. 5,667,542 and 5,704,952.

SUMMARY OF THE INVENTION

Thus, what is desired in the industry is a load resistant coating for abrasive articles that can be used under relatively low abrading pressures typically useful in abrading relatively soft surfaces, such as plastics, paint, etc.

Preferably, an abrasive article in accordance with the present invention includes a peripheral coat comprising an antiloading component of the formula: $(C_nH_{2n+1})$—COO—M, wherein n is greater than 7 and M is selected from Group 1 of the Periodic Table, with the proviso that when M is lithium, n is greater than 21.

The term "peripheral coat", as used herein, refers that portion of a coating on an abrasive article present on at least a portion of a surface of the abrasive article, typically over and in between at least a portion of the plurality of abrasive particles, that is capable of contacting and abrading the surface of a workpiece by the abrasive article.

One aspect of the present invention provides an abrasive article including a backing having a first major surface and a second major surface; a plurality of abrasive particles; and a binder which adheres the plurality of abrasive particles to the first major surface of the backing. Also included is a peripheral coat comprising an antiloading component of the formula: $(C_nH_{2n+1})$—COO—M, wherein n is greater than 17 and M is selected from Group 1 of the Periodic Table, with the proviso that when M is lithium, n is greater than 21. In one embodiment, the binder is a make coat and the abrasive article may further include a size coat. Additionally, the abrasive particles may be dispersed within the binder forming an abrasive coating on the first major surface of the backing. The peripheral coating may further include a binder.

In any case, the binder included in an abrasive article in accordance with the present invention is formed from a binder precursor selected from the group of a phenolic resin, an aminoplast resin having pendant α,β-unsaturated carbonyl groups, a urethane resin, an epoxy resin, a urea-aldehyde resin, an isocyanurate resin, a melamine-aldehyde resin, an acrylate resin, an acrylated isocyanurate resin, an acrylated urethane resin, an acrylated epoxy resin, a bismaleimide resin, a polyester resin, and a mixture thereof.

Preferably, the antiloading component is present in the peripheral coating in an amount of about 50 weight percent to about 100 weight percent based on a total weight percent of the peripheral coating.

Another aspect of the present invention provides a method of making an abrasive article including the steps of providing a backing having at least one major surface; applying a make coat binder precursor over the at least one major surface of the backing; and applying a plurality of abrasive particles to the make coat binder precursor. Also included is the step of applying a size coat binder precursor over the make coat binder precursor and the plurality of abrasive particles; and at least partially curing the make coat binder precursor and the size coat binder precursor to form a make coat and a size coat, respectively. The method also includes the step of applying peripheral coating composition over at least a portion of the size coat, wherein the peripheral coating composition comprises an antiloading component of the formula $(C_nH_{2n+1})$—COO—M, wherein n is greater than 17 and M is selected from Group 1 of the Periodic Table, with the proviso that when M is lithium, n is greater than 21.

Preferably, the peripheral coating composition further comprises a liquid medium, wherein the liquid medium can be selected from the group of an organic solvent based medium, an aqueous based medium, and a mixture thereof More preferably, the peripheral coating composition comprises a dispersion of the antiloading component in the liquid medium. The peripheral coating composition may further include an optional additive. Preferably the optional additive is a surfactant and the liquid medium is water.

DETAILED DESCRIPTION OF PREFERRED EMBODIMENTS

Abrasive Articles

Abrasive articles in accordance with the invention typically comprise a plurality of abrasive particles, a binder which adheres the plurality of abrasive particles to the first major surface of the backing, and a peripheral coat comprising an antiloading component. Preferably, the antiloading component has the formula: $(C_nH_{2n+1})$—COO—M, wherein n is greater than 17 and M is selected from Group 1 of the Periodic Table, with the proviso that when M is lithium, n is greater than 21. Examples of abrasive articles include coated abrasive articles such as lapping or structured abrasive articles, and nonwoven abrasive articles.

Coated abrasive articles of the invention include a backing having a first major surface and a second major surface; a plurality of abrasive particles; a binder which adheres the plurality of abrasive particles to the first major surface of the backing; and a peripheral coat including an antiloading component of the formula $(C_nH_{2n+1})$—COO—M, wherein n is greater than 17 and M is selected from Group 1 of the Periodic Table, with the proviso that when M is lithium, n is greater than 21. Preferably, the binder forms a make coat and the abrasive article further includes a size coat, wherein the peripheral coat is on at least a portion of the size coat.

A backing for a coated abrasive article of the present invention can be any number of various materials conventionally used as backings in the manufacture of coated abrasives, such as paper, cloth, film, polymeric foam, vulcanized fiber, woven and nonwoven materials, and the like, or a combination of two or more of these materials or treated versions thereof. The backing may also be a laminate of paper/film, cloth/paper, film/cloth, and the like. The choice of backing material will depend on the intended application of the abrasive article. The strength of the backing should be sufficient to resist tearing or other damage in use, and the thickness and smoothness of the backing should allow achievement of the product thickness and smoothness desired for the intended application.

The backing in a coated abrasive article may have an optional saturant coat, a presize coat and/or a backsize coat. The purpose of these coats is to seal the backing and/or to protect the yarn or fibers in the backing. If the backing is a cloth material, at least one of these coats may be required. The addition of the presize coat or backsize coat may additionally result in a "smoother" surface on either the front and/or the back side of the backing.

Additionally, an antistatic material may be included in any of these cloth treatment coats. The addition of an antistatic material can reduce the tendency of the coated abrasive article to accumulate static electricity when sanding wood or wood-like materials. Additional details concerning antistatic backings and backing coats (treatments) can be found in, for example, U.S. Pat. Nos. 5,108,463; 5,137,542 (Buchanan et al.); 5,328,716 (Buchanan); and 5,560,753 (Buchanan et al.).

The backing may also be a fibrous reinforced thermoplastic, for example, as disclosed in U.S. Pat. No. 5,417,726 (Stout et al.), or an endless spliceless belt, for example, as disclosed in U.S. Pat. No. 5,573,619 (Benedict et al.). Likewise, the backing may be a polymeric substrate having hooking stems projecting therefrom, for example, as disclosed in U.S. Pat. No. 5,505,747 (Chesley et al.). Similarly, the backing may be a loop fabric, for example, as described in U.S. Pat. No. 5,565,011 (Follett et al.).

In some instances, it may be preferred to incorporate a pressure sensitive adhesive onto the back side of the coated abrasive such that the resulting coated abrasive can be secured to a back up pad. Representative examples of pressure sensitive adhesives suitable for this invention include latex crepe, rosin, acrylic polymers and copolymers, including polyacrylate ester, e.g., polybutylacrylate, vinyl ethers, e.g., polyvinyl n-butyl ether, alkyd adhesives, rubber adhesives, e.g., natural rubber, synthetic rubber, chlorinated rubber, and mixtures thereof. A preferred pressure sensitive adhesive is an isooctylacrylate:acrylic acid copolymer.

The coated abrasive can be in the form of a roll of abrasive discs, as described in U.S. Pat. No. 3,849,949 (Steinhauser et al.). The coated abrasive may be converted into a variety of different shapes and forms such as belts, discs, sheets, tapes, daisies and the like. The belts may contain a splice or a joint, alternatively the belts may be spliceless such as that taught in U.S. Pat. No. 5,573,619 (Benedict et al.).

Alternatively, the coated abrasive may contain a hook and loop type attachment system to secure the coated abrasive to the back up pad. The loop fabric may be on the back side of the coated abrasive with hooks on the back up pad. Alternatively, the hooks may be on the back side of the coated abrasive with the loops on the back up pad.

A hook and loop type attachment system is further described in U.S. Pat. Nos. 4,609,581 (Ott), 5,254,194 (Ott et al.) and 5,505,747 (Chesley et al.). Alternatively, the make coat precursor may be coated directly onto the loop fabric, for example, as disclosed in U.S. Pat. No. 5,565,011 (Follett et al.).

It is also feasible to adhere the abrasive particles to both a major or working surface and the opposite surface of a backing. The abrasive particles can be the same or different from one another. In this aspect, the abrasive article is essentially two sided; one side can contain a plurality of abrasive particles which are different from a plurality of abrasive particles on the other side. Alternatively, one side can contain a plurality of abrasive particles having a different particle size than those on the other side. In some instances, this two sided abrasive article can be used in a manner in which both sides of the abrasive article abrade at the same time. For example, in a small area such as a corner, one side of the abrasive article can abrade the top workpiece surface, while the other side can abrade the bottom workpiece surface.

Nonwoven abrasives are included within the scope of the invention. Nonwoven abrasives are described generally in U.S. Pat. Nos. 2,958,593 (Hoover et al.) and 4,991,362

(Heyer et al.). In the present invention, an antiloading component is present in a part of the abrasive article which will ultimately contact a workpiece during abrading, i.e., in a peripheral portion of the nonwoven abrasive article. For example, in accordance with the present invention, the antiloading component can be in a binder or in a peripheral coating over at least a portion of the binder.

Bonded abrasive articles are also within the scope of the invention. A bonded abrasive article typically includes a binder which adheres abrasive particles together in the form of a molded product. Bonded abrasive articles are generally described in U.S. Pat. No. 4,800,685 (Haynes). In accordance with the present invention, an antiloading component is present in a peripheral coating over at least a portion of the binder or in the matrix of the bonded abrasive articles.

Binders

Binders suitable for an abrasive article of the present invention are formed from a binder precursor that may be dispersed or solubilized in an organic solvent, water, or a mixture thereof. Preferably, the binder is formed from a cured or solidified binder precursor and serves to adhere a plurality of abrasive particles to a substrate (i.e., a backing for a coated abrasive or a nonwoven for a nonwoven abrasive). The binder included in the make coat, size coat and the supersize coat may be formed from the same binder precursor or each may be formed from a different binder precursor.

The term "binder precursor", as used herein, refers to an uncured or a flowable material. The binder precursor is preferably a thermosetting material. More preferably, the binder precursor is selected from the group of a phenolic resin, an aminoplast resin having pendant $\alpha,\beta$-unsaturated carbonyl groups, a urethane resin, an epoxy resin, a urea-aldehyde resin, an isocyanurate resin, a melamine-aldehyde resin, an acrylate resin, an acrylated isocyanurate resin, an acrylated urethane resin, an acrylated epoxy resin, a bismaleimide resin, a polyester resin, and a mixture thereof.

Phenolic resins are well known in the art and are commonly used as an abrasive article binder precursor because of their thermal properties, availability, cost and ease of handling. There are two types of phenolic resins, resole and novolac. Resole phenolic resins have a molar ratio of aldehyde to phenol of greater than or equal to one, typically between 1.5:1.0 to 3.0:1.0. Novolac resins have a molar ratio of aldehyde to phenol of less than one.

Suitable aminoplast resins having pendant $\alpha,\beta$-unsaturated carbonyl groups are also known in the art, such as described in U.S. Pat. Nos. 4,903,440 (Larson et al.); 5,055,113 (Larson et al.); and 5,236,472 (Kirk et al.).

Suitable urethanes for a binder precursor may be prepared by reacting near stoichiometric amounts of polyisocyanates with polyfunctional polyols. The more common types of polyisocyanates are toluene diisocyanate (TDI) and 4,4'-diisocyanatodiphenylmethane (MDI). Common polyols for flexible polyurethanes are polyethers such as polyethylene glycols, polypropylene glycols, and polytetramethylene oxides.

Epoxy resins utilized in a binder precursor have an oxirane ring and are polymerized by ring opening. Such epoxide resins include monomeric epoxy resins and polymeric epoxy resins. These resins can vary greatly in the nature of their backbones and substituent groups. Suitable epoxy resins include those described in U.S. Pat. No. 4,751,138 (Tumey et al.).

Urea-aldehyde resins employed in binder precursor compositions comprise urea or any urea derivative and any aldehyde which are capable of being coatable, have the capability of reacting together at an accelerated rate in the presence of a catalyst, preferably a cocatalyst, and which afford an abrasive article with abrading performance acceptable for the intended use. The resins comprise the reaction product of an aldehyde and a "urea". A urea-aldehyde resin useful in the present invention include those described in U.S. Pat. No. 5,486,219 (Ford et al.).

Acrylated isocyanurates useful in a binder precursor are isocyanurate derivatives having at least one pendant acrylate group, which are further described in U.S. Pat. No. 4,652,274 (Boettcher et al.). Useful bismaleimide resins are further described in U.S. Pat. No. 5,314,513 (Miller et al.).

In addition to thermosetting resins, a hot melt resin may also be used as a binder precursor. For example, a binder precursor system may comprise a hot melt pressure sensitive adhesive which can be energy cured to provide a binder. In this instance, because the binder precursor is a hot melt composition, it is particularly useful with porous cloth, textile or fabric backings. Because this binder precursor does not penetrate the interstices of the porous backing, the natural flexibility and pliability of the backing is preserved. Exemplary hot melt resins are described in U.S. Pat. No. 5,436,063 (Follett et al.).

Abrasive Particles

Abrasive particles useful in the invention can be of any conventional grade utilized in the formation of abrasive articles. Suitable abrasive particles can be formed of, for example, flint, garnet, ceria, aluminum oxide (including fused and heat-treated aluminum oxide), alumina zirconia including fused alumina zirconia as disclosed, for example, in U.S. Pat. Nos. 3,781,172; 3,891,408; and 3,893,826, and commercially available from the Norton Company of Worcester, Mass., under the trade designation "NorZon", diamond, silicon carbide (including refractory coated silicon carbide as disclosed, for example, in U.S. Pat. No. 4,505,720 (Gabor et al.), silicone nitride, alpha alumina-based ceramic material, as disclosed, for example, in U.S. Pat. Nos. 4,518,397 (Leitheiser et al.); 4,574,003 (Gerk et al.); 4,744,802 (Schwabel et al.); 4,770,671 (Monroe et al.); 4,881,951 (Wood et al.); and 5,011,508 (Wald et al.); titanium diboride; boron carbide; tungsten carbide; titanium carbide; iron oxide; cubic boron nitride; and mixtures thereof.

Abrasive particles may be individual abrasive grains or agglomerates of individual abrasive grains. Abrasive particles may have a particle size ranging from about 0.01 micrometers to about 1500 micrometers, preferably from about 1 micrometer to about 1000 micrometers. The frequency (concentration) of the abrasive particles on the backing depends on the desired application and is within the purview of the skilled artisan. The abrasive particles can be oriented or can be applied without orientation, depending upon the requirements of the particular abrasive product.

The abrasive particles may be applied as an open or closed coat. A closed coat is one in which the abrasive particles completely cover the major surface of the backing. In an open coat, the abrasive particles cover about 20% to about 90% of the major surface of the backing, typically about 40% to about 70%. For constructions in accordance with the present invention, open coating of abrasive particles is typically utilized.

An abrasive article of the present invention may contain a blend of abrasive grains and diluent particles. Diluent particles can be selected from the group consisting of (1) an inorganic particle (non-abrasive inorganic particle), (2) an organic particle, (3) an abrasive agglomerate containing abrasive grains, (4) a composite diluent particle containing a mixture of inorganic particles and a binder, (5) a composite diluent particle containing a mixture of organic particles and a binder.

Optional Additives

Optional additives, such as, for example, fillers (including grinding aids), fibers, antistatic agents, lubricants, wetting agents, surfactants, pigments, dyes, coupling agents, plasticizers, release agents, suspending agents, and curing agents including free radical initiators and photoinitiators, may be included in abrasive articles of the present invention. The optional additives may be included in a binder precursor or in a bond system. These optional additives may further require that additional components be included in the binder precursor composition to aid in curing; for example, a photoinitiator may be required when acrylates are used. The amounts of these materials can be selected to provide the properties desired.

For example, a binder precursor and/or a peripheral coating can further include a surfactant, preferably, an anionic surfactant, i.e., a surfactant capable of producing a negatively charged surface active ion. Preferable anionic surfactants are selected from the group of sodium dodecylbenzene sulfonate, sodium dodecyl sulfate, and a mixture thereof. Preferably, the anionic surfactant is in an amount sufficient to allow for forming a substantially uniform dispersion, particularly of the antiloading, component in an aqueous based liquid medium and also to provide more uniform wetting of the backing, the make coat and the abrasive particles. More preferably, the anionic surfactant is present in an amount of about 10% by weight or less, even more preferably about 5% by weight or less, and most preferably about 2% by weight based on the weight of the antiloading component. The anionic surfactant may be dispersed at substantially the same time in an aqueous based liquid medium as the antiloading component. Sonication, homogenization, and/or milling may be required to form a substantially uniform dispersion.

Antiloading Component Present in a Peripheral Coating

An antiloading component is preferably present in a peripheral coating, as defined above. Thus, the peripheral coating may be present over a size coat (if a make and size coat are present), over a supersize coat, over an abrasive coating, over abrasive composites, or over binder of a nonwoven or bonded abrasive article.

A peripheral coating is prepared from a peripheral coating composition comprising an antiloading component of the formula $(C_nH_{2n+1})$—COO—M, wherein n is greater than 17 and M is selected from Group 1 of the Periodic Table, with the proviso that when M is lithium, n is greater than 21. That is, M is preferably selected from the group of lithium, sodium, potassium, rubidium, cesium, and francium, and more preferably, M is selected from the group of lithium, sodium, potassium and cesium. Additionally, and more preferably, n is greater than 19 with the proviso that then M is lithium, n is greater than 21.

Preferably, the peripheral coating composition includes a liquid medium, more preferably, the liquid medium is selected from the group of an organic solvent based medium, an aqueous based medium, and a mixture thereof. The peripheral coating composition may further contain a binder precursor, an optional additive, and a mixture thereof, each as described above. If present, the binder precursor is in an amount of about 20% or less based on the weight of the active antiloading component.

Method of Applying an Antiloading Component

Typically, as mentioned above, the antiloading component is present in a peripheral coating composition that preferably includes a liquid medium. Preferably, the peripheral coating composition includes a liquid medium selected from the group of an organic solvent based medium, an aqueous based medium, and a mixture thereof. More preferably, the peripheral coating composition includes a dispersion of an antiloading component in an aqueous based medium. An antiloading component is typically present in a peripheral coating composition in an amount preferably of about 50% to about 100%, more preferably about 70% to about 100%, and most preferably, about 85% to about 100% of the total dry weight of the antiloading formulation. A peripheral coating composition may further include a binder precursor, an optional additive, and a mixture thereof, each as described above.

A peripheral coating composition containing an antiloading component can be applied by brushing or coating the peripheral coating composition on an abrasive article, for example, by roll coating, curtain coating, die coating, spray coating, and the like. Once applied, the peripheral coating composition is preferably solidified, e.g., dried, at a temperature which is dependent upon the type and amount of liquid medium included in the composition. For example, the temperature is generally about 20° C. to about 200° C., typically about 60–120° C., preferably about 80–100° C. for a period of time sufficient to solidify, e.g., dry, the peripheral coating composition to form the peripheral coat. Typically, the period of time required is about 3 minutes to about 30 hours, preferably about 5 minutes to about 10 hours, and more preferably about 10 minutes to about two hours. In most instances, the peripheral coating composition can be dried in an oven at a temperature of about 80° C. for about 10 minutes or it can be dried overnight at room temperature (about 20° C.).

The dry, peripheral coating weight of any embodiment of the present invention depends upon the coated abrasive grade (i.e., the particle size of the abrasive particle). Typically, the coarser or the larger the abrasive particle is, the higher the coating weight will be. For a given grade, if the peripheral coat weight is too high, the abrasive particles may be hidden. If the peripheral coat weight is too low, this tends to decrease the optimal performance of the resulting abrasive article. In general, a guideline that can be used for the peripheral coat weight is about 4–12 g/m$^2$ for an abrasive particle grade of P400; about 5–15 g/m$^2$ for an abrasive particle grade of P320; about 7–25 g/m$^2$ for an abrasive particle grade of P180; about 9–30 g/m$^2$ for an abrasive particle grade of P120.

Methods of Using Abrasive Articles

An abrasive article in accordance with the present invention can be used for abrading various workpieces or substrates such as wood; wood-like materials (e.g., fiber board, particle board, and the like); fiberglass; varnishes; polyester coatings; stained surfaces; automotive body filler; ceramics; glass; paint (including latex paint; oil paint, automotive paint, and the like); and primers (e.g., oil-based primers; water-based primers, automotive primers, and the like). As used herein, the term "abrading" refers to grinding, polishing, surface removal, surface finishing, and the like.

A method of abrading a workpiece includes contacting a surface of the workpiece with a peripheral portion of an abrasive article with sufficient force to abrade the surface of the workpiece while the peripheral portion and surface of the workpiece are moving relative to one another. Either the workpiece or the abrasive article may be stationary. Typically, the force sufficient to abrade the surface of the workpiece is more than about 0.2 kg/cm$^2$.

EXAMPLES

The following non-limiting examples will further illustrate the invention. All parts, percentages, ratios, etc., in the examples are by weight unless otherwise indicated. All antiloading materials evaluated are prepared from commercially available compounds from Aldrich Chemical Co., Milwaukee, Wis., unless otherwise noted.

Examples 1–4 and Comparative Examples A–C

A grinding aid component, listed in Table 1, formed a peripheral surface of an abrasive article according to the following protocol.

One mole of the alkyl carboxylic acid shown in Table 1 was dissolved in 3500 milliliters of tetrahydrofuran (THF) in a 5 liter beaker. The beaker was fitted with a mechanical stirrer and held in a temperature-controlled water bath to which heat was supplied so that the dissolving solution could be maintained at room temperature (about 22° C.). One mole of a metal hydroxide in methanol or water, as shown in Table 1, was slowly added with vigorous stirring. A white precipitate formed.

The white precipitate was filtered with a filter funnel under reduced pressure and then was washed twice with THE (2×500 ml of THF). The white precipitate was then dried in an oven at about 93° C. for about 60 minutes to form a dry white powder.

A peripheral coating composition was then prepared. 100 grams of the dry powder formed above was dispersed in 400 grams of water with 2% sodium dodecylbenzene sulfonate, based on the weight of the powder, with a sonifier commercially available under the trade designation of BRANSON Sonifier 250, from Branson Ultrasonics Corporation, Danbury, Conn., with the output control set at 10 and the duty cycle set at 100% for 15 minutes.

TABLE 1

| Example | # Carbon Atoms in Alkyl Carboxylic Acid | Metal in hydroxide | Resulting Antiloading Component |
|---|---|---|---|
| Comp. Ex. B | 18 | Sodium | sodium stearate |
| Example 1 | 28 | Sodium | sodium octacosanate |
| Example 2 | 20 | Potassium | potassium eicosanate |
| Example 3 | 28 | Potassium | potassium octacosanate |
| Comp. Ex. C | 20 | Lithium | lithium eicosanate |
| Example 4 | 28 | Lithium | lithium octacosanate |

Preparation of Abrasive Articles

Coated abrasive articles representative of the present invention were prepared by applying the peripheral coating composition, as described above, to a coated abrasive disc (lacking a supersize coat) that are commercially available under the trade designation Imperial Disks, grade P320 without an antiloading coating, from Minnesota Mining and Manufacturing Company, St. Paul, Minn. A peripheral coating was applied on a 4 inch disk at a weight of 0.085 g of solids per disk with a brush. The abrasive disks were dried in an oven at about 80° C. for 10 minutes. The antiloading component for each Example and Comparative Example is listed in Table 2 below. Comparative Example A was an Imperial Disk, grade P320 without an antiloading coating.

TABLE 2

| Example | Antiloading Component | Total # of carbon atoms in antiloading component |
|---|---|---|
| Comp. Ex. A | — | — |
| Comp. Ex. B | sodium stearate | 18 |

TABLE 2-continued

| Example | Antiloading Component | Total # of carbon atoms in antiloading component |
|---|---|---|
| Example 1 | sodium octacosanate | 28 |
| Example 2 | potassium eicosanate | 20 |
| Example 3 | potassium octacosanate | 28 |
| Comp. Ex. C | lithium eicosanate | 20 |
| Example 4 | lithium octacosanate | 28 |

Schiefer Test

This test provides a measure of the cut (material removed from a workpiece) of the abrasive articles described above under dry conditions (about 22° C. and about 45% Relative Humidity).

A 10.2 cm diameter circular disc was cut from the abrasive material to be tested and secured by a pressure-sensitive double adhesive tape (commercially available from Minnesota Mining and Manufacturing Company, St. Paul, Minn., under the trade designation "3M Industrial Tape #442") to a back-up pad. The back-up pad was secured to the driven plate of a Schiefer Abrasion Tester (available from Frazier Precision Company, Gaithersburg, Md.). Doughnut shaped cellulose acetate butyrate polymer workpieces, 10.2 cm outside diameter, 5.24 inside diameter, 1.27 cm thick, available from Seelye Plastics, Minneapolis, Minn., were employed as workpieces. The initial weight of each workpiece was recorded to the nearest milligram prior to mounting on the workpiece holder of the abrasion tester. A 4.5 kg weight was placed on the abrasion tester weight platform and the mounted abrasive specimen lowered onto the workpiece and the machine turned on. The machine was set to run for 500 cycles and then automatically stopped. After each 500 cycles of the test, the workpiece was wiped free of debris and weighed. The cumulative cut for each 500-cycle test was the difference between the initial weight before each set of 500 cycles and the weight following each set of 500 cycles. The endpoint of the test was 2,000 cycles. The amount of loading was determined visually on a scale of 1 to 5, where "1" indicates substantially no loading and is the most desirable and "5" indicates substantial loading and is the least desirable. The results of the test for each abrasive article tested are shown in Table 3 below.

TABLE 3

| Example | 2000 cycle/cut (g) | loading (1–5 scale) |
|---|---|---|
| Comp. Ex. A | 1.94 | 5 |
| Comp. Ex. B | 5.87 | N/A |
| Example 1 | 6.9 | N/A |
| Example 2 | 4.97 | 4.0 |
| Example 3 | 5.7 | 1.5 |
| Comp. Ex. C | 4.35 | 3.5 |
| Example 4 | 4.93 | 3.5 |

The data in Table 3 indicates that all abrasive articles containing a peripheral coat including an antiloading component outperformed Comparative Example A that did not contain peripheral coating including an antiloading component. Further, the data indicates that when an abrasive article included an antiloading component of a metal salt of an alkyl carboxylic acid having a total of 28 carbon atoms, the abrasive article demonstrated better performance than an abrasive article that included the same metal salt having a shorter aliphatic chain (i.e., 20 as compared to 28, Examples 2 and 3, respectively).

Patents and patent applications disclosed herein are hereby incorporated by reference as if individually incorporated. It is to be understood that the above description is intended to be illustrative, and not restrictive. Various modifications and alterations of this invention will become apparent to those skilled in the art from the foregoing description without departing from the scope and the spirit of this invention, and it should be understood that this invention is not to be unduly limited to the illustrative embodiments set forth herein.

What is claimed is:

1. An abrasive article comprising:
    a backing having a first major surface and a second major surface;
    a plurality of abrasive particles;
    a binder which adheres the plurality of abrasive particles to the first major surface of the backing; and
    a peripheral coat comprising an anti-loading component consisting of a compound of the formula:

$(C_nH_{2n+1})$—COO—M wherein n is greater than 17 and M is selected from the group consisting of sodium, potassium, rubidium, cesium, and francium.

2. The abrasive article of claim 1 wherein the binder comprises a make coat and the abrasive article further comprises a size coat.

3. The abrasive article of claim 1 wherein the abrasive particles are dispersed within the binder forming an abrasive coating on the first major surface the backing.

4. The abrasive article of claim 1 wherein the peripheral coating further comprises a binder.

5. The abrasive article of claim 1 wherein the binder is formed from a binder precursor selected from the group of a phenolic resin, an aminoplast resin having pendant α,β-unsaturated carbonyl groups, a urethane resin, an epoxy resin, a urea-aldehyde resin, an isocyanurate resin, a melamine-aldehyde resin, an acrylate resin, an acrylated isocyanurate resin, an acrylated urethane resin, an acrylated epoxy resin, a bismaleimide resin, a polyester resin, and a mixture thereof.

6. The abrasive article of claim 1 wherein the antiloading component is present in the peripheral coating in a amount of about 50 weight percent to about 100 weight percent based on a total weight percent of the peripheral coating.

7. The abrasive article of claim 1 wherein the backing is selected from the group consisting of paper, cloth, film, a polymeric foam, vulcanized fiber, a woven material, a nonwoven material, treated versions thereof, and combinations thereof.

8. The abrasive article of claim 1 further comprising a pressure sensitive adhesive on the second major surface of the backing.

9. The abrasive article of claim 1 wherein the abrasive selected particles are from the group consisting of flint, garnet, ceria, aluminum oxide, alumina zirconia, diamond, silicon carbide, silicon nitride, alpha alumina ceramic material, titanium diboride, boron carbide, tungsten carbide, titanium carbide, iron oxide, cubic boron nitride, and mixtures thereof.

10. The abrasive article of claim 1 wherein the peripheral coating composition further comprises an additive selected from the group consisting of a filler, a fiber, an antistatic agent, a plasticizer, a release agent, a surfactant, a pigment, a dye, a coupling agent, a suspending agent, a curing agent, and combinations thereof.

11. The abrasive article of claim 10 wherein the additive is an anionic surfactant.

12. The abrasive article of claim 11 wherein the anionic surfactant is present in an amount of about 10% by weight or less.

13. An abrasive article comprising:
    a backing having a first major surface and a second major surface;
    a plurality of abrasive particles;
    a binder which adheres the plurality of abrasive particles to the first major surface of the backing; and
    a peripheral coat comprising an antiloading component;
    wherein the antiloading component in the abrasive article consists of a compound of the formula:

$(C_nH_{2n+1})$—COO—M wherein n is greater than 17 and M is selected from the group consisting of sodium, potassium, rubidium, cesium, and francium.

14. The abrasive article of claim 13 wherein the peripheral coating composition further comprises an additive selected from the group consisting of a filler, a fiber, an antistatic agent, a plasticizer a release agent, a surfactant, a pigment, a dye, a coupling agent, a suspending agent, a curing agent, and combinations thereof.

15. The abrasive article of claim 14 wherein the additive is an anionic surfactant.

* * * * *

UNITED STATES PATENT AND TRADEMARK OFFICE
CERTIFICATE OF CORRECTION

PATENT NO. : 6,261,682 B1  
DATED : July 17, 2001  
INVENTOR(S) : Law, Kam W.

Page 1 of 1

It is certified that error appears in the above-identified patent and that said Letters Patent is hereby corrected as shown below:

Column 2,  
Line 25, delete "than7" and insert in place thereof -- than 17 --.  
Line 28, insert -- to -- following "refers" and preceding "that".

Column 9,  
Line 22, delete "THE" and insert in place thereof -- THF --.

Column 11,  
Line 29, insert -- of -- following "surface" and preceding "the".

Column 12,  
Line 5, delete "selected particles are" and insert in place thereof -- particles are selected --.  
Line 43, delete "plasticizer" and insert in place thereof -- plasticizer, --.

Signed and Sealed this

Fourteenth Day of May, 2002

*Attest:*

*Attesting Officer*

JAMES E. ROGAN  
*Director of the United States Patent and Trademark Office*